Patented July 9, 1946

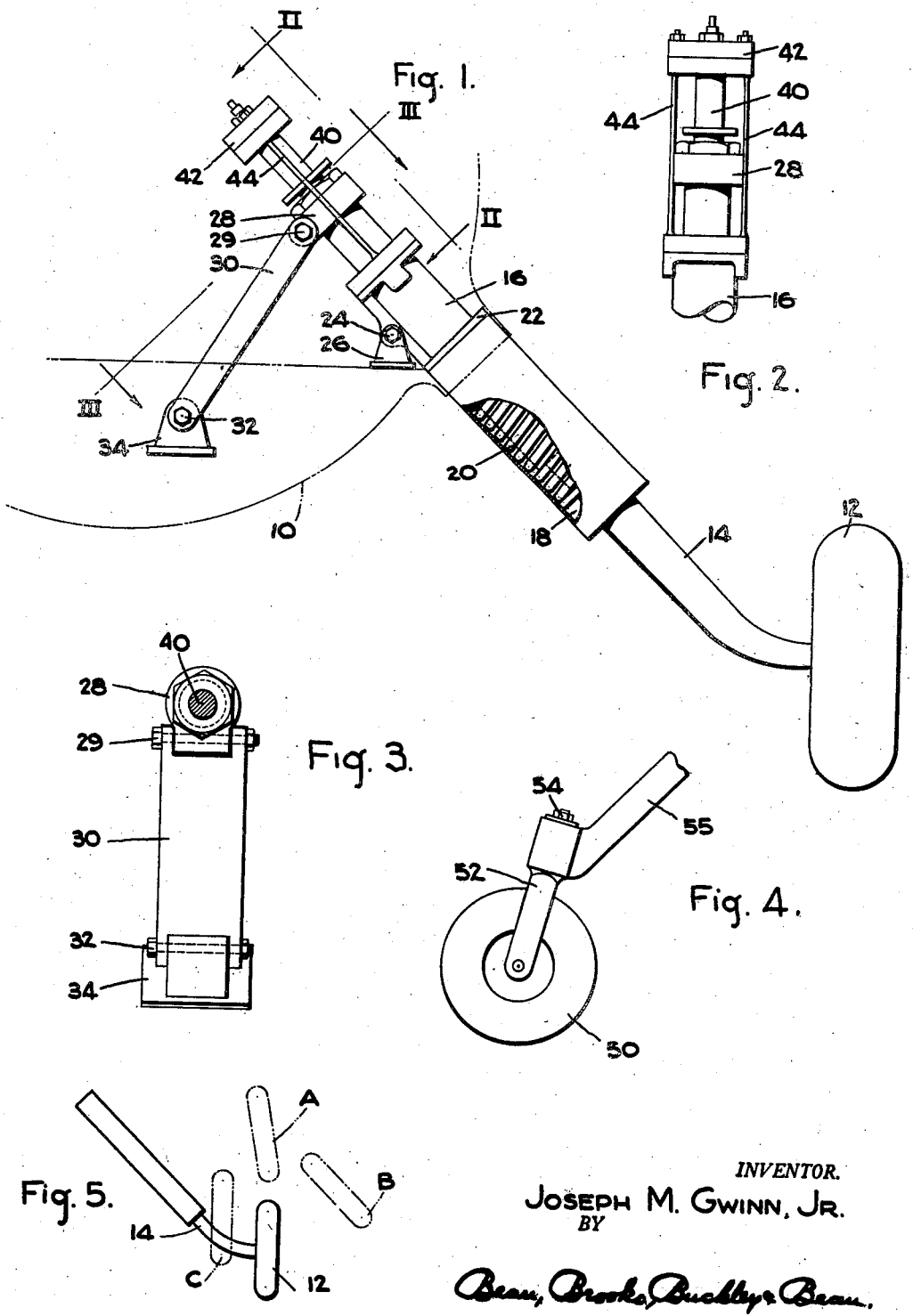

2,403,523

UNITED STATES PATENT OFFICE 2,403,523

AIRCRAFT UNDERCARRIAGE

Joseph M. Gwinn, Jr., San Diego, Calif.

Application September 18, 1944, Serial No. 554,629

8 Claims. (Cl. 244—104)

This invention relates to aircraft or road vehicle undercarriages and like devices.

With a view to structural simplification and weight reduction, prior art undercarriage arrangements of the types wherein cantilever struts are supported on and extend from the mounting body, customarily arrange such struts to extend diagonally downwardly and outwardly from the aircraft fuselage or the vehicle body, as the case may be, to support wheels or skids or the like in relatively widely spaced paired tread relation. Also, such undercarriage arrangements usually employ axially extensible and contractable strut devices in conjunction with energy-absorbing means such as, for example, some type of so-called oleo strut arrangement. Therefore load variations on such strut devices tend to cause the outboard ends thereof to move laterally as well as vertically relative to the mounting vehicle, and, for example, upon bouncing of the mounting airplane or vehicle during ground taxiing the paired undercarriage wheels tend to move relatively inwardly and outwardly so as to change the undercarriage tread dimension therebetween. Under such conditions ground friction forces acting against the wheel tires tend to peel the tires sidewise off the wheels and impose damaging stresses thereon, and interfere with free operations of the shock-absorbing devices of the telescopic strut elements.

More specifically, one presently conventional prior art form of airplane landing gear employing extensible-contractable oleo struts extending diagonally from the fuselage provides that the landing wheels move inwardly toward the fuselage incidental to upward movements thereof; and such arrangements are supersensitive to external loads, thus making the airplane laterally unstable while ground taxiing. Another conventional prior art landing gear of the type referred to provides the landing wheels to move outwardly as they move upwardly relative to the fuselage; and this provides an airplane that is very stable while taxi-turning but very poor in shock-absorbing characteristics, as explained hereinabove. In fact, in both of the prior art arrangements just referred to hereinabove the ground friction forces so interfere with lateral motions of the wheels such as are necessarily incidental to vertical motions thereof as to prevent the oleo strut devices from performing effective shock absorption functions of which they may otherwise be capable.

The present invention contemplates elimination of the difficulties and disadvantages of the prior art as hereinabove set forth, and to this end one of the objects of the invention is to provide that the outboard end portions of the undercarriage wheel struts are displaceable in directions axially thereof incidental to shock-absorbing operations, while the strut devices are simultaneously controlled so as to be automatically rotated to different attitudes of inclination relative to the vehicle body so as to cause the mounted wheels to move substantially vertically relative to the body.

Another object of the invention is to provide an aircraft flexible landing gear device of simple cantilever strut form which in improved manner accommodates landing shock absorbing actions while maintaining at all times a uniform tread width. Another object of the invention is to provide an improved inclined telescopic cantilever strut type landing gear which produces only substantially vertical displacements of the landing wheels relative to the fuselage in conjunction with shock-absorbing actions of the telescopic strut elements in response to load variations thereon.

Another object of the invention is to provide an improved inclined strut type landing gear which is of structurally simplified form and permits, optionally, a full choice of either vertically or inwardly or outwardly and straight-line or curving paths to be taken by the mounted landing wheel incidental to shock-absorbing displacements thereof. Other objects and advantages of the invention will be apparent from the specification hereinafter.

In the drawing:

Fig. 1 is a front elevation of one landing strut unit of a paired landing wheel type aircraft undercarriage of the invention;

Fig. 2 is a fragmentary view taken along line II—II of Fig. 1;

Fig. 3 is a section taken along line III—III of Fig. 1;

Fig. 4 is a fragmentary side elevation of an airplane nose or tail wheel unit embodying the features of the invention; and Fig. 5 is a diagram illustrating comparatively operation of a gear of the invention and of prior art arrangements.

Figs. 1-3 illustrate the invention in conjunction with one wheel-carrying strut of a typical paired-wheel type airplane landing gear such as customarily comprises a pair of cantilever landing wheel struts extending diagonally downwardly and outwardly from opposite sides of the fuselage 10 of the airplane of the drawing. Thus, assuming Fig. 1 to present the airplane fuselage fragmentarily in front view, the drawing shows the left hand landing wheel unit of the airplane; and it will be understood that an identical landing wheel and strut unit is also carried by the fuselage 10 to extend from the right hand side thereof to complete the dual landing wheel arrangement. To simplify the drawing and this specification, however, only one of the landing wheel and strut units is shown and described in detail.

The landing wheel is indicated at 12 to be rotatably mounted upon any suitable axle formation extending integrally from the lower end of a strut member 14 which is carried by a sleeve 16 in telescopic mounted relation therein. The strut 14 carries a shoulder device as at 18 to bear against one end of a compression spring 20, and the other end of the spring 20 is mounted against a shoulder portion 22 of the sleeve 16. The sleeve 16 is pivotally mounted by means of a pin connection device 24 upon a bracket 26 which is carried rigidly by the aircraft fuselage frame. Adjacent its upper or inboard end the strut 14 mounts a ring 28 which pivotally connects by means of a pin 29 to the upper end of a link 30, and the lower end of the link 30 pivotally connects as at 32 to a bracket 34 which is fixed upon the fuselage frame at a position laterally offset from the longitudinal axis of the landing wheel strut unit.

The upper end of the strut 14 is shown to be hollowed to provide an oleo chamber carrying a plunger 40 which is fixed to a cross head 42 tied to the casing 16 by tie rods 44—44 for absorbing landing impact energies.

Thus, it will be understood that, assuming the drawing at Fig. 1 to illustrate the relative positions of the operative elements of the landing gear mechanism when the aircraft is in flight, upon landing of the airplane the landing forces against the wheel 12 will actuate the strut 14 to move inwardly of the sleeve 16 against the action of the spring 20 and the oil piston, thus absorbing the landing shock. Simultaneously with such axial movement of the strut 14 relative to the sleeve 16, however, the upper end of the strut will be guided by the link 30 to rotate about the axis of the connection pin 32, whereby the strut 14 will be rocked bodily about the axis of the pivot pin 24. This deflects the direction of landing wheel movement outwardly relative to the path it would have taken if the strut 14 were not so rocked upon its mounting connection; and the strut and guide link elements of the mechanism are so proportioned and relatively arranged that the composition of motions so transmitted to the landing wheel 12 will cause the latter to move only due vertically. Hence, undesirable lateral motions of the landing wheel such as are invariably attendant shock absorbing operations of conventional landing gear mechanisms of comparable type, are completely avoided.

Fig. 5 illustrates diagrammatically operation of the invention in comparison to mechanisms of the prior art. As shown in this figure, for example, the landing wheel and strut unit 12—14 of the invention is arranged as explained hereinabove so as to adapt the wheel 12 to move substantially vertically as to the position indicated at A incidental to shock absorber deflections of the unit relative to the mounting body. A fixedly mounted telescoping strut and shock absorber unit of prior art type would in the same installation provide the landing wheel to move such as to the position indicated at C; and a fixed-length pivoting strut unit of prior art type would operate to provide the wheel 12 to move such as to the position designated B. Thus, it is shown how the gear of the invention may be arranged to provide a constant wheel tread distance while hereinabove referred to arrangements of the prior art result in varying tread dimensions incidental to each shock absorber operation.

It will be appreciated that the operative elements of the mechanism of the invention may be so relatively dimensioned and arranged as to provide an infinite variety of paths of wheel travel relative to the mounting body in between straight line motions in directions axially of the mounting strut and arcuately about the axis of pivotal connection of the strut unit to the body. Thus, it will be appreciated that the invention gives the vehicle designer a full choice with respect to the path to be taken by the ground wheel relative to the mounting body incidental to shock absorber deflections of the undercarriage; and that by suitably proportioning the operative elements of the strut and rotation guiding mechanisms the wheel may be caused to move either vertically or obliquely upwardly and either inwardly or outwardly, and that the path taken by the wheel may be arranged to be either substantially straight-line or curving to any desired degree simply by proper selections of relative positions for the pivot points of the mechanism and proper dimensioning of the rotational guide link.

Fig. 4 illustrates in side view a typical nose or tail wheel 50 such as is customarily employed in connection with so-called tricycle or conventional undercarriage arrangements for aircraft; the landing wheel being carried by a castoring or steerable fork 52 in a bearing 54 at the lower end of a strut 55. The strut 55 may be a counter part of the strut 14 of Figs. 1–3, and equipped at its upper end with a combination shock absorber and motion guiding mechanism as shown and described in detail in connection with the landing gear of Figs. 1–3; whereby the direction of motion of the landing wheel 50 relative to the vehicle frame will be controlled as hereinabove explained.

Thus, the invention enables the aircraft designer to mount the tricycle nose wheel in such manner as to control the wheel base length at various nose wheel shock absorber deflections. If the gear is designed specifically for absorbing ground travel bumps the strut unit can be arranged to extend largely horizontally away from the fuselage to provide for any degree of vertical motion desired. Thus, the invention provides complete control of the path of the landing wheel incidental to shock absorber deflections, independently of the position of the basic connection between the wheel carrying strut and the vehicle body or frame.

It will be appreciated that the undercarriage mechanism of the invention is of utmost mechanical simplicity and ruggedness. To provide the rocking sleeve mount for the landing wheel strut the conventionally present oleo tube is employed, and particular attention is called to the fact that all of the pivot control link mechanism is housed interiorly of the airplane fuselage and that only aerodynamically "clean" tubular structures extend to carrying the landing wheels beyond the fuselage. Although only a limited number of applications of the invention have been shown and described in detail it will be apparent to those skilled in the art that the invention is

I claim:

1. In aircraft, an undercarriage strut unit extending in a substantially inclined attitude from the body of said aircraft, said strut unit comprising a bearing member, a strut member mounted upon said bearing member and movable thereon in the direction of extent of said unit, energy-absorbing means interconnecting said bearing and strut members, said bearing member being pivotally connected to said aircraft at a position intermediately of the ends of said strut member, and a link pivotally connected at one of its ends to said strut member at a position offset from the position of said pivotal connection and extending laterally therefrom into connection at its other end to a positionally fixed portion of the aircraft.

2. In aircraft, an undercarriage strut unit extending in a substantially inclined attitude from the body of said aircraft, said strut unit comprising a sleeve member, a strut member slidably mounted within said sleeve member and movable thereon in the direction of extent of said unit, energy-absorbing means interconnecting said sleeve and strut members, said sleeve member being pivotally connected to said aircraft at a position intermediately of the ends of said strut member, and a link pivotally connected at one of its ends to said strut member at a position offset from the position of said pivotal connection and to a positionally fixed portion of the aircraft.

3. In aircraft, an undercarriage strut unit extending in a substantially inclined attitude from the body of said aircraft, said strut unit comprising a bearing member, a strut member mounted upon said bearing member and movable thereon in the direction of extent of said unit, energy-absorbing means interconnecting said bearing and strut members, said bearing member being pivotally connected to said aircraft at a position intermediately of the ends of said strut member, and guide means engaging one end of said strut member at a position offset from the position of said pivotal connection and extending laterally from the direction of longitudinal extent of said strut member and constructed and arranged to cause the strut member to rock about said pivotal connection incidental to relative movements between said strut and bearing members.

4. In aircraft, an undercarriage strut unit extending in a substantially inclined attitude from the body of said aircraft, said strut unit comprising a bearing member, a strut member mounted upon said bearing member and movable thereon in the direction of extent of said unit, a compression spring interconnecting said bearing and strut members to resist inboard movements of the strut relative to the bearing, said bearing member being pivotally connected to said aircraft at a position intermediately of the ends of said strut member, and a link pivotally connected at one of its ends to said strut member at a position offset from the position of said pivotal connection and extending laterally therefrom into connection at its other end to a positionally fixed portion of the aircraft.

5. A vehicle running gear including a strut unit extending in a substantially inclined attitude from the body of said vehicle, said strut unit comprising a bearing member, a strut member mounted upon said bearing member and movable thereon in the direction of extent of said unit, elastic means interconnecting said bearing and strut members, said bearing member being pivotally connected to said aircraft at a position intermediately of the ends of said strut member, and guide means engaging one end of said strut member at a position offset from the position of said pivotal connection and extending laterally from the direction of longitudinal extent of said strut member and constructed and arranged to cause the strut member to rock about said pivotal connection incidental to relative movements between said strut and bearing members.

6. In aircraft, an undercarriage strut unit extending in a substantially inclined attitude from the body of said member mounted to extend telescopically through said bearing member and movable thereon in the direction of extent of said unit, a compression spring interconnecting said bearing and strut members to resist inboard movements of the strut relative to the bearing, said bearing member being pivotally connected to said aircraft at a position intermediately of the ends of said strut member, and a link pivotally connected at one of its ends to the inboard end of said strut member at a position offset from the position of said pivotal connection and extending laterally therefrom into connection at its other end to a positionally fixed portion of the aircraft.

7. In aircraft, an undercarriage strut unit extending in a substantially inclined attitude from the body of said aircraft, said strut unit comprising a sleeve member, a strut member slidably mounted within said sleeve member and movable thereon in the direction of extent of said unit, energy-absorbing means interconnecting said sleeve and strut members, said sleeve member being pivotally connected to said aircraft at a position intermediately of the ends of said strut member, and a link pivotally connected at one of its ends to said strut member at a position offset from the position of said pivotal connection and to a positionally fixed portion of the aircraft, whereby upon sliding movement of said strut member relative to said sleeve member the outboard end of said strut will move in a controlled path intermediately of the direction of said strut axis and arcuately about the axis of said sleeve pivotal connection.

8. In an aircraft, a landing gear member arranged to carry a landing wheel at its outboard end having an axis extending at a substantial inclination from vertically, said member being movable along said axis relative to said aircraft, slide bearing means mounting said movable member intermediately of its ends, said bearing means being positionally fixed but mounted for pivoting relative to said aircraft, and means engaging the inboard end of said movable member to rock the latter relative to said aircraft automatically upon axial movement of said member.

JOSEPH M. GWINN, JR.